Dec. 15, 1953         C. E. FOSTER         2,662,300
THREAD-GAUGING DEVICE
Filed Sept. 9, 1950

INVENTOR.
CHARLES E. FOSTER,
BY
ATTORNEYS.

Patented Dec. 15, 1953

2,662,300

UNITED STATES PATENT OFFICE 2,662,300

THREAD-GAUGING DEVICE

Charles E. Foster, Indianapolis, Ind.

Application September 9, 1950, Serial No. 183,953

5 Claims. (Cl. 33—199)

This invention relates to a device for gaging tapped holes. In the operation of gaging tapped holes, it is customary to employ "go" and "no go" threaded plugs which are screwed into the hole to be tested to determine whether or not the thread is of proper pitch and pitch diameter. One of the difficulties encountered in so gaging tapped holes arises from the fact that the torque applied to the gage-plug affects its entrance into the threaded hole. Accordingly, it is necessary in practice to take precautions to make sure that the torque applied to the threaded gage plug will be reasonably uniform. Gaging machines have been built in which the gage plugs are power driven through a clutch adapted to slip when subjected to a maximum predetermined torque; but such machines are relatively complicated and expensive.

It is therefore an object of this invention to produce a device for gaging tapped holes, which device can be simply and economically manufactured and can be operated to apply a reasonably uniform torque to the gage plugs. Another object of the invention is to produce a gaging device which can be manually and expeditiously operated.

In carrying out the invention, I employ a spindle adapted at its opposite ends for connection to coaxial threaded gage plugs. On this spindle there are mounted for independent rotation a pair of hollow housing members through the interior of which the spindle extends. Within the housing, there are rotatably mounted on the spindle a pair of spools upon each of which is wound a pair of flexible tapes having free ends extending outwardly through slots in the wall of the associated housing member, the arrangement being such that as the tapes are withdrawn from the housing the spool will rotate about the spindle-axis. Each spool is connected to the spindle through a ratchet which causes the spool to drive the spindle when the tapes are being pulled out of the housing but which permits the spool to rotate independently of the spindle in the reverse direction and rewind the tapes under the influence of a spring. Desirably, each housing-member is operatively connected to the spindle through a ratchet which permits the spindle to rotate in the housing when driven by the associated spool but which prevents reverse rotation of the spindle relative to the housing member.

Figure 1:
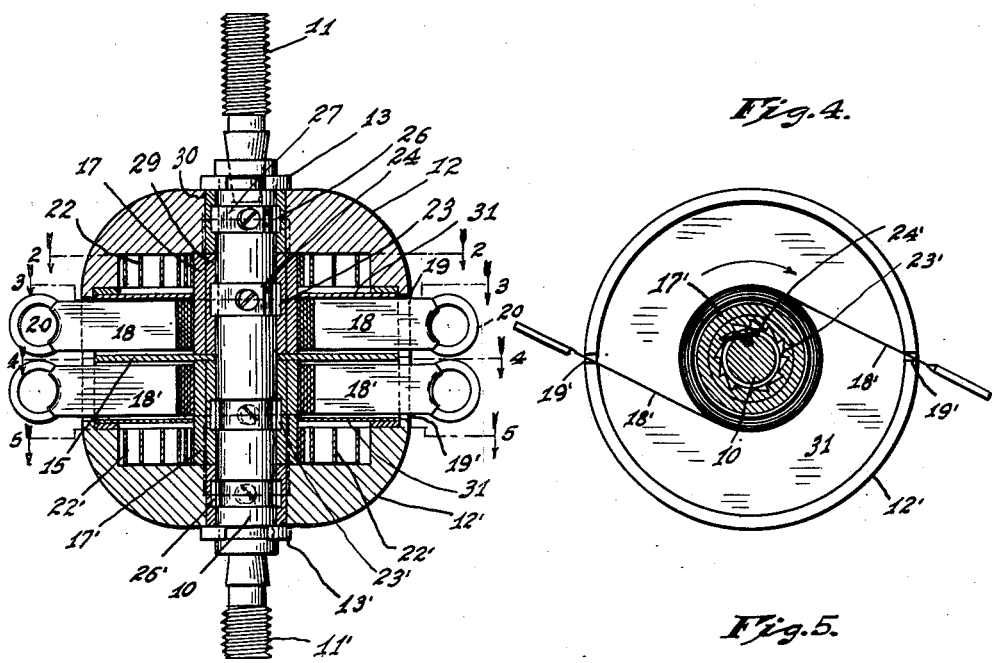
Figure 4:
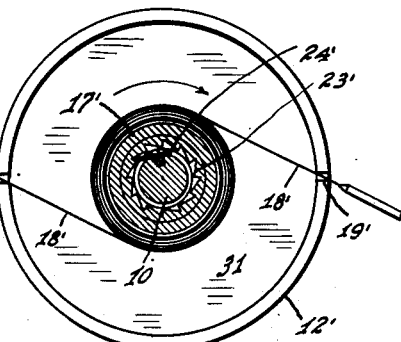
Figure 2:
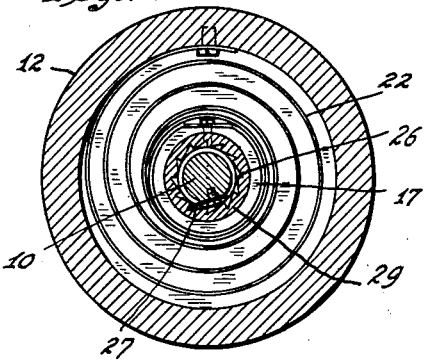
Figure 5:
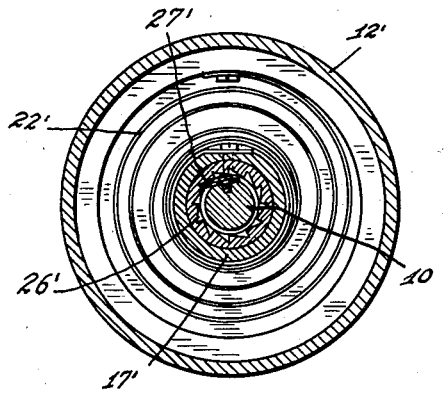
Figure 3:
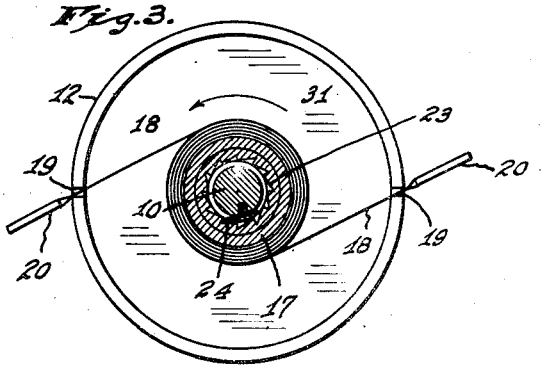

The accompanying drawing illustrates the invention: Fig. 1 is an axial section through the assembled device, and Figs. 2, 3, 4, and 5 are transverse sections on the lines 2—2, 3—3, 4—4, and 5—5, respectively, of Fig. 1.

The device shown in the drawing embodies a spindle 10 provided in its ends with axial, tapered recesses for the reception of the shanks of plug gages 11 and 11', the former being a "go" gage and the latter a "no go" gage. Mounted for independent rotation on the body of the spindle 10 are two cup-like housing members 12 and 12' arranged in opposed relation and retained on the spindle as by means of split spring rings 13 and 13'. A central disk-like partition 15 divides axially the interior of the housing formed by the two members 12 and 12'.

Mounted for rotation on the spindle 10 on opposite sides of the partition 15 are two spools 17 and 17' each of which is located axially of the spindle by engagement with the central partition 15 and an end wall of the associated housing member. Connected to the spool 17 are a pair of flexible tapes 18 which, after being wrapped for several turns in the same direction and in interleaved fashion around the spool, extend tangentially of the spool and outwardly through diametrically opposite slots 19 in the associated housing-member. The outer ends of the tapes are provided with any convenient form of handles 20 which facilitate grasping of the tape-ends and also prevent the tape-ends from passing inwardly through the slots 19 into the interior of the housing. Axially outward beyond the tapes, there is located a spiral spring 22 the inner end of which is secured to the spool 17 and the outer end of which is secured to the housing member 12. The arrangement of the spring 22 is such that it tends to rotate the spool 17 in the direction which will cause the tapes 18 to be wound thereon.

The spool 17 is provided interiorly with an annular series of ratchet teeth 23 with which there cooperates a pawl 24 carried by the spindle 10, the arrangement of the ratchet teeth being such as to interconnect the spool and spindle for joint rotation when the tapes 18 are pulled outwardly but to permit the spool 17 to rotate freely on the spindle in the reverse direction under the influence of the spring 22. Desirably, the housing member 12 is provided with an annular series of ratchet teeth 26 with which there cooperates a pawl 27 on the spindle 10, such ratchet serving to permit the spindle to rotate in the housing member when the tapes 18 are pulled out but to prevent rotation of the spindle in the housing member in the opposite direction.

The construction below the partition 15 is identical with the construction above such partition, as above set forth. That is, the spool 17' has a pair of tapes 18' wound in the same direction on it and is connected to the spindle 10 through a series of ratchet teeth 23' on the spool and a pawl 24' on the spindle. A spring 22' urges the spool 17' in the tape-winding direction; and a ratchet device comprising teeth 26' on the housing member 12' and a pawl 27' on the spindle permits the spindle to rotate in the housing 12' when the tapes 18' are withdrawn but prevents spindle-rotation in the opposite direction.

If desired, each spool 17 or 17' may be provided with bearing bushings 29 and each housing member 12 or 12' with bearing bushings 30. Also, if desired, each housing member may be provided with a disk-like partition 31 separating the tapes 18 or 18' from the springs 22 or 22'.

Viewing the device from the upper end in Fig. 1, the ratchets 23—24 and 23'—24' are oppositely arranged, the former permitting and the latter preventing clockwise rotation of the associated spool 17 or 17' on the spindle 10. The ratchets 26—27 and 26'—27' are likewise oppositely arranged, the ratchet 26—27 permitting the housing member 12 to rotate in a clockwise direction on the spindle 10 while the ratchet 26'—27' prevents the housing member 12' from rotating in a clockwise direction on the spindle. Like the corresponding ratchets on opposite sides of the partition 15, the springs 22 and 22' are oppositely arranged, the former tending to rotate the spool 17 in a clockwise direction (Figs. 2 to 5) in the housing member 12 and the latter serving to rotate the spool 17' in a counterclockwise direction in the housing member 12'. Each pair of tapes 18 and 18' is arranged on its associated spool so that, when withdrawn, they will rotate such spool against the effort exerted thereon by the associated spring.

In employing the device described, the gage-plug which is to be used is started into the hole to be gaged. If it is assumed in Fig. 1 that the "no go" gage plug 11' is to be used, it may be started into the hole by applying a rotating effort to it, to the opposite gage plug 11, or to the lower housing member 12'. When the plug enters the hole to be gaged a distance such that the hole will support the device, the handles on the ends of the tape 18' are grasped and those tapes are pulled outwardly of the housing. As will be clear from Fig. 4, such outward movement of the tapes 18' rotates the spool 17' in the clockwise direction, and such rotation will be transmitted to the spindle 10 through the ratchet 23'—24'. Since the tapes 18' are under tension and pass through slots 19, in the housing member 12, that housing member will not rotate; but the ratchet 26'—27' will permit the spindle to rotate in the clockwise direction in such housing member. Because the housing member 12' remains stationary while the spool 17' and spindle 10 rotate in a clockwise direction, the spring 22' will be wound. Clockwise rotation of the spindle 10 will be transmitted to the upper housing member 12 through the ratchet 26—27; and such housing member and the upper spool 17 will rotate as a unit with the spindle 10. The tension applied to the tapes 18 determines the rotative effort which is applied to the gage plug 11' which, being a "no go" plug, should bind in the hole if the latter is not too large. When the gage plug 11' binds or has been rotated to the limit permitted by complete extension of the tapes 18', those tapes are released. Upon release of the tapes, the spring 22' rotates the spool 17' to rewind them, the spindle remaining stationary by virtue of the friction between the gage plug 11' and the hole. The reaction of the spring 22' on the housing member 12' cannot create rotation thereof, for such rotation is prevented by the ratchet 26'—27'. Accordingly, in the rewinding of the tapes 18' only the spool 17' rotates, all other parts of the device remaining stationary. To withdraw the plug 11' from the hole, the upper tapes 18 are grasped and pulled outwardly. As will be clear from Fig. 3, this operation rotates the spool 17 in a counterclockwise direction, and such rotation is transmitted to the spindle 10 through the ratchet 23—24. Withdrawal of the tapes 18 winds the spring 22, so that when the tapes 18 have been withdrawn to the extent necessary to free the gage plug 11' from the hole, the tapes 18 may be released and the spring 22 will rewind them on the spool 17. In such rewinding operation, the ratchet 23—24 permits the spool 17 to rotate without rotating the spindle 10.

When the gage plug 11 is to be used, it is started into a hole to an extent sufficient to provide support for the gaging device, and the tapes 18 are pulled outwardly from the housing to run the plug 11 into the hole. On release of the tapes 18, they are rewound by the spring 22 while the spindle 10 remains stationary, as is permitted by the ratchet 23—24. To withdraw the plug 11, the tapes 18' are pulled from the housing; and upon their release, they are rewound on the spool 17 by the spring 22'.

The above description of the operation of the device presupposes that the holes and gage plugs have right-hand threads. If the threads are left-hand threads, the operation is the same as described above except that the tapes used to screw in a plug with a left-hand thread will be those employed to withdraw a plug with a right-hand thread, and vice-versa.

Since the two tapes on each spool are wound in the same direction, an outward pull on each tape tends to rotate the spool in the same direction. The operator, by pulling simultaneously on the two tapes in diametrically opposite directions is able to apply torque to the spool without imposing on the device any net lateral effort tending to cause misalignment of the gage and the hole. In other words, the misaligning tendency of the pull on one tape can be balanced or counteracted by the directly opposite pull on the other tape. With slight practice, the operator can control the applied torque to a reasonably uniform value, and will reject pieces into which the "go" gage will not enter upon the application of that reasonably uniform torque. The fact that the operator can pull simultaneously on two coplanar tapes with his hands in the same position, using the same muscles in his two arms, and moving both hands at the same rate makes for the application of equal efforts to the two tapes and for the consequent elimination of any net tendency to "cock" the gage plug.

I claim as my invention:

1. A thread-gaging device, comprising a gage-spindle, a pair of housing members mounted on the spindle for independent rotation, a spool rotatably mounted on the spindle within each housing member, pairs of tapes respectively wrapped on said spools in opposite directions, each of the housing members having a pair of diametrically opposite slots, the tapes of each pair being wrapped in the same direction and extending from the spool upon which they are wrapped respectively through the slots of the associated housing, a spring acting between each spool and its associated housing member and biasing the spool for rotation in the tape-winding direction, a ratchet acting between each housing member and the spindle and preventing rotation of the housing member relative to the spindle by the reaction of the associated spring on the housing member but permitting housing-member rotation in the opposite direction, and a ratchet acting between each spool and the spindle and permitting the spool to rotate in the tape-winding direction but preventing relative rotation of the spool and spindle in the opposite direction.

2. A thread-gaging device, comprising a gage-spindle, a pair of housing members mounted on the spindle for independent rotation, a spool rotatably mounted on the spindle within each housing member, pairs of tapes respectively wrapped on said spools in opposite directions, each of the housing members having a pair of diametrically opposite slots, the tapes of each pair being wrapped in the same direction and extending from the spool upon which they are wrapped respectively through the slots of the associated housing, a spring acting between each spool and its associated housing member and biasing the spool for rotation in the tape-winding direction, and a ratchet acting between each spool and the spindle and permitting the spool to rotate in the tape-winding direction but preventing relative rotation of the spool and spindle in the opposite direction.

3. A thread-gaging device, comprising a gage spindle, a housing member rotatable on said spindle, a spool rotatably mounted on the spindle within the housing member, said member having a pair of diametrically opposite slots, a pair of tapes wrapped in the same direction on said spool and extending outwardly through the respective slots, a spring acting between the member and spool and biasing the spool for rotation in the tape-winding direction, a ratchet acting between the spool and spindle for permitting their relative rotation in the tape-winding direction and preventing their relative rotation in the opposite direction, and a ratchet acting between the member and spindle for preventing relative rotation of the member and the spindle under the reaction of the spring on the housing but permitting relative rotation of the housing in the opposite direction.

4. A thread-gaging device, comprising a gage spindle, a housing member rotatable on said spindle, a spool rotatably mounted on the spindle within the housing member, said member having a pair of diametrically opposite slots, a pair of tapes wrapped in the same direction on said spool and extending outwardly through the respective slots, a spring acting between the member and spool and biasing the spool for rotation in the tape-winding direction, and a ratchet acting between the spool and spindle for permitting their relative rotation in the tape-winding direction and preventing their relative rotation in the opposite direction.

5. A thread-gaging device, comprising a gage spindle, a spool rotatably mounted on said spindle, a pair of tapes wound in the same direction on said spool and simultaneously withdrawable therefrom by opposite movements of their free ends to rotate the spool in one direction, a ratchet interconnecting the spindle and spool for joint rotation when the tapes are withdrawn but permitting free rotation of the spool relative to the spindle in the tape-winding direction, and means biasing said spool for rotation in the tape-winding direction.

CHARLES E. FOSTER.

References Cited in the file of this patent

UNITED STATES PATENTS

| Number | Name | Date |
|---|---|---|
| 204,990 | Morey | June 18, 1878 |
| 628,992 | Roberts | July 18, 1899 |

FOREIGN PATENTS

| Number | Country | Date |
|---|---|---|
| 104,950 | Great Britain | Mar. 22, 1917 |
| 892,741 | France | Jan. 13, 1944 |